United States Patent [19]

Hayashi

[11] Patent Number: 5,263,123
[45] Date of Patent: Nov. 16, 1993

[54] FUZZY BACKWARD REASONING SYSTEM AND EXPERT SYSTEM UTILIZING THE SAME

[75] Inventor: Yoichi Hayashi, Hitachi, Japan

[73] Assignee: Hitachi Engineering Co., Ltd., Ibaraki, Japan

[21] Appl. No.: 666,923

[22] Filed: Mar. 11, 1991

[30] Foreign Application Priority Data

Sep. 10, 1990 [JP] Japan .................................. 2-236965

[51] Int. Cl.$^5$ ............................................. G06F 15/00
[52] U.S. Cl. ....................................... 395/51; 395/900; 395/52
[58] Field of Search ....................... 395/3, 61, 900, 51, 395/52

[56] References Cited

PUBLICATIONS

Method of Solution to Fuzzy Inverse Problem; Tsukamoto et al; Translations of the Society of Instrument and Control Engineers; vol. 15, No. 1; pp. 21-25; 1979.

*Primary Examiner*—Allen R. MacDonald
*Attorney, Agent, or Firm*—Antonelli, Terry, Stout & Kraus

[57] ABSTRACT

A system for controlling a target apparatus includes a supplying section, a reasoning section, and a control section. The supplying section supplies n states of the target apparatus ($n \geq 2$ and an integer). The reasoning section receives the n sensed states as n results from the supplying section and performs fuzzy backward reasoning for data representing the n results and causality data to generate certainties of m causes ($m \geq 2$ and an integer). The control section controls the target apparatus in accordance with the certainties of the causes.

9 Claims, 13 Drawing Sheets

STRONG α-CUT

WEAK α-CUT

α-CUT FOR "TRUE"

FIG. 9

| $R_{ij}$ $a_i$ $b_j$ | SYMPTOM | ABNORMAL STATE OF URINARY | | | | |
|---|---|---|---|---|---|---|
| | | INCREASE OF URINARY VOLUME | DECREASE OF URINARY VOLUME | FOAMING URINARY | TURBID URINARY | HEMATURIA |
| DISEASE | | 1 | 2 | 3 | 4 | 5 |
| RENAL DISEASE | | | | | | |
| ACUTE NEPHRITIS | 1 | | | RT | | RT |
| NEPHROTIC SYNDROME | 2 | | VT | VT | | |
| CHRONIC RENAL FAILURE | 3 | PT | | RT | | |
| URINARY TRACT STONE | 4 | | | PT | RT | RT |
| CYSTITIS | 5 | | | PT | PT | |
| PROSTATAUXE | 6 | | | | | RF |

IN CASE OF (I-1)

IN CASE OF (i)

IN CASE OF (ii)

FIG. 11D $$C^A = i \begin{bmatrix} 1 & \cdots & j_1 & \cdots & j_t & \cdots & j_s & \cdots & n \\ & & O & & O & & O & & \\ \vdots & & \vdots & & \vdots & & \vdots & & \vdots \\ & & O & & O & & O & & \\ O & \cdots & O & O & \cdots & O & 1 & O & \cdots & O & 1 & O & \cdots & O \\ & & O & & O & & O & & \\ \vdots & & \vdots & & \vdots & & \vdots & & \vdots \\ & & O & & O & & O & & \\ m & & O & & O & & O & & \end{bmatrix}$$

IN CASE OF (II-1)

FIG. 11E $$C^A = i \begin{bmatrix} 1 & \cdots & j_1 & \cdots & j_t & \cdots & j_s & \cdots & n \\ & & O & & O & & O & & \\ \vdots & & \vdots & & \vdots & & \vdots & & \vdots \\ & & O & & O & & O & & \\ 1 & & 1 & & 1 & & 1 & & 1 \\ & & O & & O & & O & & \\ \vdots & & \vdots & & \vdots & & \vdots & & \vdots \\ m & & O & & O & & O & & \end{bmatrix}$$

IN CASE OF (II-2)

EXAMPLES OF MEMBERSHIP FUNCTIONS

| EXAMPLE | PRIOR ART ($\mu$ sec) | INVENTION ($\mu$sec) |
|---|---|---|
| 1 | 393638727 | 15648 |
| 2 | 566047507 | 15990 |
| 3 | 388409028 | 15568 |
| 4 | 89807188 | 15572 |
| 5 | 1070386433 | 15835 |
| 6 | 948397506 | 15588 |
| 7 | 1601897270 | 15963 |
| 8 | 603007592 | 15765 |
| 9 | 543550052 | 15763 |
| 10 | 765786978 | 15665 |
| AVERAGE | 697052828.1 | 15735.7 |

FUZZY BACKWARD REASONING SYSTEM AND EXPERT SYSTEM UTILIZING THE SAME

BACKGROUND OF THE INVENTION

1. Field of the Invention

The present invention relates to a fuzzy backward reasoning system for inferring causes from results and an expert system utilizing the same. More specifically, the present invention is concerned with a reasoning system capable of making inference on a real time basis as well as a real-time expert system utilizing the same.

2. Description of the Related Art

As a method of inferring causes from results on the basis of imprecise knowledge of a sympton, (i.e., result and a relation between each cause and each result, as with the case of a medical diagnosis or a fault diagnosis, there is known a fuzzy backward reasoning method in which solution of an inverse problem of fuzzy correspondence is determined. Although many proposals have been made in conjunction with this method, there can be mentioned among them the proposal disclosed in an article by Tukamoto, Y. and Tashiro, T. entitled "Method of Solution to Fuzzy Inverse Problem" (Transactions of The Society of Instrument and Control Engineers, Vol. 15, No. 1, pp. 21-25, 1979) as the one in which adaptability to practical problems is taken into consideration. Before entering into details of the prevent invention, the fuzzy theory which is handled in the present application will briefly be described together with the fuzzy correspondence inverse problem and a method of solution thereof disclosed in the article cited above.

A set of those elements x of a universal set X which are fuzzy or uncertain as to whether belong to the set is referred to as a fuzzy set A. Such a fuzzy set A can be defined by giving the elements x degrees or extents to which the elements x are contained in the set A. A function capable of giving or determining the degree mentioned above is referred to as the membership function and represented by $\mu_A(x)$. This function $\mu_A(x)$ has a property defined as follows:

$$0 \leq \mu_A(x) \leq 1$$

For the universal set X, fuzzy sets A and B, a membership function $\mu_A(x)$ (where $x \in x$), there may be defined operations which are mentioned below:

| | |
|---|---|
| Universal set: | $\mu_X(x) = 1 \ \forall_x \in X$ |
| Empty set: | $\mu_\phi(x) = 0$ |
| Complementary set $\bar{A}$: | $\mu_{\bar{A}}(x) = 1 - \mu_A(x)$ |
| Sum set: | $\mu_{A \cup B} = \min[\mu_A(x), \mu_B(x)]$ |
| Product set: | $\mu_{A \cap B} = \min[\mu_A(x), \mu_B(x)]$ |
| Equal relationship: | $A = B \rightleftarrows \mu_A(x) = \mu_B(x)$ |
| Containing relationship: | $A \subset B \rightleftarrows \mu_A(x) = \mu_B(x)$ |
| Law of double negation: | $\bar{\bar{A}} = A$ |
| De morgan's law: | $\overline{A \cup B} = \bar{A} \cap \bar{B}$ |
| | $\overline{A \cap B} = \bar{A} \cup \bar{B}$ |

It should however be noted that neither law of the excluded middle nor law of the contradiction which can be applied to an ordinary set can be applied to the fuzzy set. In other words, $$A \cup \bar{A} \neq X \quad A \cap \bar{A} \neq \phi$$

In the fuzzy set A, $$A\alpha = \{x | \mu_A(x) > \alpha\}; \alpha \in [0, 1]$$

$$A\alpha = \{x | \mu_A(x) \geq \alpha\}; \alpha \in [0, 1]$$

are referred to as strong $\alpha$-cut and weak $\alpha$-cut, respectively, which are graphically represented, in FIGS. 1A and 1B of the accompanying drawings, respectively.

Truth values imprecisely represented by not a numerical interval form as in the classical logic and the many-valued logic but a linguistic form such as "true", "very true", etc. are referred to as the linguistic truth values or LTV for short. These linguistic truth values (LVTs) may be represented by a fuzzy set on a truth value space [0, 1].

Now, let's consider a method of giving a numerical interval to the linguistic truth value or LTV and assume, by way of example, that a numerical interval be given to the LTV of "true". To this end, a membership function is given to the LTV "true". The membership function may be selected arbitrarily. It is assumed that the membership function is of a linear line form, as illustrated in FIG. 2 of the accompanying drawings. By cutting the membership function at $\alpha$, i.e., the $\alpha$-cut, the numerical interval for the LTV of "true" is determined. By way of example, assuming that $\alpha = 0.8$, then a numerical interval [0.8, 1] can be determined for the LTV of "true" by the $\alpha$-cut, as shown in FIG. 2.

Next, the fuzzy correspondence inverse problem will be considered.

Let's represent sets which contain two different types of events, e.g., items of cause and items of sympton, respectively, as follows:

$$X = \{x_i | i = 1, \ldots, m\}$$

$$Y = \{y_j | j = 1, \ldots, n\}$$

In that case, the fuzzy sets A and B for which the above-mentioned sets are the universal sets, respectively, can be written as follows:

$$A = \sum_{i=1}^{m} a_i/x_i, \text{ where } a_i \in [0, 1]$$

$$B = \sum_{j=1}^{n} b_j/y_j, \text{ where } b_j \in [0, 1]$$

where $a_i$ and $b_j$ represent the degrees to which elements $x_i$ and $y_j$ are contained in the fuzzy sets A and B, respectively.

The fuzzy sets A and B can conveniently be represented in terms of vectors of membership grades as follows:

$$\mathbf{a} = (a_1, \ldots, a_m)$$

$$\mathbf{b} = (b_1, \ldots, b_n)$$

When X represents a universal set of prerequisite conditions, e.g., cause items and Y represents a universal set of conclusions or results, e.g., sympton items, there may be conceived a diagnostic system for deriving the conclusions (results) from the prerequisite conditions. There exist causalities between the individual items $x_i$ of the prerequisite conditions and the individual items $y_i$ of the conclusions (results).

Thus, a fuzzy set C on the XY-space can be written as follows:

$$C = \sum_{i=1,j=1}^{m,n} \gamma_{ij}/(x_i, y_j), \text{ where } \gamma_{ij} \in [0, 1]$$

where $\gamma_{ij}$ represents the degrees to which the element $(x_i, y_j)$ belong to the fuzzy set C. Let's express a matrix with $m \times n$ elements containing $\gamma_{ij}$ as an i-th row and j-th column element as follows:

$$R = \{\gamma_{ij}\}$$

When a fuzzy composition of the fuzzy set A and the fuzzy set C results in a fuzzy set B, this may be written as $$A \cdot C = B$$

wherein an operational rule referred to as a fuzzy relational equation and given by $$a \cdot R = b$$

can be applied, where $a_i, b_j \gamma_{ij} \in [0, 1]$ and "o" represents a max - min composition, i.e. $\vee\{a_i \cap \gamma_{ij}\} = b_j$, where $\cup$ and $\cap$ represent "max" and "min", respectively.

Thus, the inverse problem of the fuzzy relational equation can be said to be a problem of "determining all elements of a fuzzy set a which satisfy the relational equation of $a \cdot R = b$, when a fuzzy relation R is given together with the individual elements of a fuzzy set b in terms of numerical values, respectively, of the interval [0, 1]".

In this conjunction, it is noted that the fuzzy relation can be determined by the relation of the fuzzy set B to the fuzzy set A. Thus, the fuzzy relation can be represented by mapping as follows:

$$R: \tilde{P}(X) \rightarrow \tilde{P}(Y)$$

On the other hand, fuzzy correspondence is determined by correspondence of the fuzzy set B of a fuzzy set to the fuzzy set A and may thus be expressed by mapping:

$$\tilde{\gamma}: \tilde{P}(X) \rightarrow \tilde{P}(\tilde{P}(Y))$$

where $\tilde{P}(X)$ represents a family of all the fuzzy sets on X.

Further, the fuzzy set B can be written as follows:

$$B = \{(y_j, \tilde{b}_j)\}$$

where $\tilde{b}_j$ represent the degrees by which the element $y_j$ belong to the fuzzy set B and can be given by a fuzzy set in the interval [0, 1]. An n-dimensional vector containing $\tilde{b}_j$ as the j-th element is written as follows:

$$\tilde{b} = (\tilde{b}_1, \ldots, \tilde{b}_n) \subset [0, 1]^n$$

Thus, when the fuzzy set C on the XY-space is given, then one fuzzy correspondence $\Gamma$ is determined. In this conjunction, the fuzzy set C may be written as follows:

$$C = \{(x_i, y_j), \tilde{\gamma}_{ij}\}$$

where $\tilde{\gamma}_{ij}$ represent degrees by which the element $(x_i, y_j)$ belong to the fuzzy set C and which can be represented by a fuzzy set in [0, 1]. Let's express a matrix with $m \times n$ elements containing an element $\tilde{\gamma}_{ij}$ as the i-th row and j-th column element as follows:

$$\tilde{R} = \{\tilde{\gamma}_{ij}\} \subset [0, 1]^{m \times n}$$

Thus, it is safe to say that the inverse problem of fuzzy correspondence can be reduced to a problem of "determining an inverse mapping $\Gamma^{-1}(b)$ of fuzzy correspondence when $\tilde{b} \subset [0, 1]^n$ and $\tilde{R} \subset [0, 1]^{m \times n}$ are given as the grades of symptons and the causalities between the causes and the symptons, respectively," where $\tilde{b}$ is a vector representation of the fuzzy set B and $\tilde{R}$ is a matrix representation of the fuzzy set C.

A method of solution of the fuzzy a correspondence inverse problem is proposed in Tsukamoto et al's article recited hereinbefore. According to the proposal, a $\alpha$-cut set of the fuzzy correspondence inverse mapping is determined by solving the inverse problem of $a \cdot \tilde{R} = \tilde{b}$, where $$a = \{a \mid \exists R, \exists b; R \in \tilde{R}, b \in \tilde{b}, a \cdot R = b\}$$

In the above exprssion, $\tilde{R} = \{\tilde{\gamma}_{ij}\}$ and $\tilde{b} = (\tilde{b}_1, \ldots, \tilde{b}_n)$ represent a matrix and a vector containing as respective elements the sets of intervals of real numbers in [0, 1] corresponding to $\tilde{R}\alpha$ and $\tilde{b}\alpha$ ($\alpha$-cut sets of $\tilde{R}$ and $\tilde{b}$, respectively). Further, $b \in \tilde{b}$ and R R represent $\forall j, b_j \in \tilde{b}_j$ and $\forall i, \forall j, \gamma_{ij} \in \tilde{\gamma}_{ij}$, respectively.

In the following table, there are summarized comparisons between the inverse problem of fuzzy relational equation and tmhe inverse problem of fuzzy correspondence.

|  | Fuzzy Relation Inverse Problem | Fuzzy Correspondence Inverse Problem |
| --- | --- | --- |
| Certainty of Causality between Cause and Sympton | real values in [0, 1] | fuzzy set R in [0, 1] |
| Grade of Sympton | real values in [0, 1] | fuzzy set b in [0, 1] |

A model utilizing the fuzzy correspondence is more flexible when compared with a model utilizing the fuzzy relational equation.

Now, let's consider a method of solving the inverse problem of fuzzy correspondence.

First, $\bar{\epsilon}$-composition and $\epsilon$-composition are defined. For two interval value sets [a, b], [c, d] $\subset$ [0, 1], $$[a,b] \,\epsilon\, [c,d] = \begin{cases} [c,1], & \text{if } [a,b] \cap [c,d] \neq \phi \\ [c,d], & \text{if } a > d \text{ and } [a,b] \cap [c,d] = \phi \\ \phi, & \text{if } b < c \text{ and } [a,b] \cap [c,d] = \phi \end{cases}$$

$$[a,b] \,\bar{\epsilon}\, [c,d] = \begin{cases} [0,d], & \text{if } a > d \\ [0,1], & \text{otherwise} \end{cases}$$

where $\phi$ represents the empty set.

FIG. 3 is a flow chart for illustrating a method of solving an inverse problem of fuzzy correspondence proposed by Tsukamoto et al in their article recited hereinbefore.

The solution algorithm proposed by Tsukamoto et al will now be described.

At a step 1, matrixes $\overline{U}=\{\overline{u}_{ij}\}$ and $\overline{V}=\{\overline{v}_{ij}\}$ each having (m×n) elements are determined, where $$\overline{u}_{ij} = \overline{\gamma}_{ij} \in \overline{b}_j \text{ and}$$

$$\overline{v}_{ij} = \overline{\gamma}_i \in \overline{b}_j$$

When it is determined at a step 2 that $\exists j, \forall i, \overline{u}_{ij} = \phi$, decision is made that no solution exists, and the processing comes to an end.

At a step 3, a matrixes $\overline{W}^k = \{\overline{w}^k_{ij}\}$ having (m×n) elements are determined, and individual elements of each matrix $\overline{W}^k$ are given for every column j, as follows:

$$\overline{w}^k_{ij} \begin{cases} \overline{u}_{ij} \text{ for } \exists_{1i} \in [i | \overline{u}_{ij} \neq \phi] \\ \overline{v}_{ij} \text{ for other } i\text{'s} \end{cases}$$

where $\exists_{1i}$ represents selection of only one from i's satisfying $\overline{u}_{ij} \neq \phi$. Accordingly, the matrixes $\overline{W}^k$ exist for the number of combinations determined in accordance with the selection of i. Such combinations is indexed by the symbol "k".

At a step 4, a solution $\overline{a}^k$ is determined, where $$\overline{a}^k = (\overline{a}_1^k, \overline{a}_2^k, \ldots, \overline{a}_m^k)$$

$$\overline{a}_i^k = \bigcap_{j=1}^{n} \overline{w}^k_{ij}$$

At a step 5, it is checked whether k is "0". If the decision results in "Y" indicating "true", decision is made that no solution exists, and then the processing comes to an end.

At a step 6, solution $\overline{a}$ is determined in accordance with $$\overline{a} = \bigcup_{k \in K} \overline{a}^k$$

$$K = \{k | \forall i, \overline{a}_i^k \neq \phi\}$$

As will be appreciated from the foregoing, the hitherto known method of solving the inverse problem of fuzzy correspondence is disadvantageous in that the amount of theoretical computation increases in proportion to $m^{m+1} \times n$ because of necessity of preparing an enormous number of $\overline{W}^k$ matrices as the number of the causes (m) and the symptons (n) increases, thereby requiring lots of time for the computation. For this reason, the problem solving method of the prior art suffers from a difficulty that the method is difficult to be applied to an inference engine of a real time expert system.

SUMMARY OF THE INVENTION

In view of the state of the art described above, it is an object of the present invention to provide an inference or reasoning method of obtaining a solution for an inverse problem of fuzzy correspondence at a very high speed and a reasoning system for the same.

Another object of the invention is to provide an expert system which can control a target apparatus or system on a real time basis in accordance with the solution obtained by utilizing the abovementioned method.

In order to achieve the above objects, the fuzzy backward reasoning system includes:

memory means for storing a causality table having m×n elements, each of which indicates a membership grade of a corresponding cause to a corresponding effect and is represented by interval data within a predetermined numerical data range;

first generating means for reading out the causality table from the memory means and generating basic and auxiliary matrix tables each having m×n elements from the causality table and an input effect matrix table having n elements which correspond to n effects and are respectively represented by interval data within the predetermined numerical data range;

second generating means for generating a minimum matrix table having m elements, each of which represents a least upper bound value of a corresponding row of the basic matrix table;

third generating means for generating from the basic and auxiliary matrix tables a check matrix table having m×n elements, each of which has a flag set when representing a possibility of influence to a certainty of a corresponding cause;

modifying means for modifying the checking matrix table to selectively reset each flag in accordance with corresponding elements of the basic and minimum matrix tables; and fourth generating means for generating from elements having the flags set of the checking matrix table and the basic and minimum matrix tables a cause matrix table having m elements, each of which is represented by interval data within the predetermined numerical data range, the because matrix table element interval data representing a certainty of a corresponding cause.

In accordance with the reasoning or inference scheme or concept of the present invention described above, there is made, available the method of solving the inverse problem of fuzzy correspondence with a theoretical calculation amount proportional to m×n, whereby operations can be executed with a speed which is several ten thousand times as fast as the solution methods, known heretofore. Besides, according to the expert system in which the fuzzy logics (i.e. fuzzy modus ponens and fuzzy modus tollens) and the problem solving method are employed in combination, not only the inference or reasoning can be executed without need for any especial hardware even for the case where the numbers of causes and symptons are very enormous, but also the results of diagnosis can be obtained even when a plurality of failures (diseases) occur simultaneously, which in turn means that the real time control now becomes practically applicable to various systems

BRIEF DESCRIPTION OF THE DRAWINGS

FIG. 9 is a chart for illustrating examples of the causalities between causes and results;

FIGS. 11A to 11E are diagrams for illustrating the state of a matrix C;

DESCRIPTION OF THE PREFERRED EMBODIMENTS

Figure 1A:
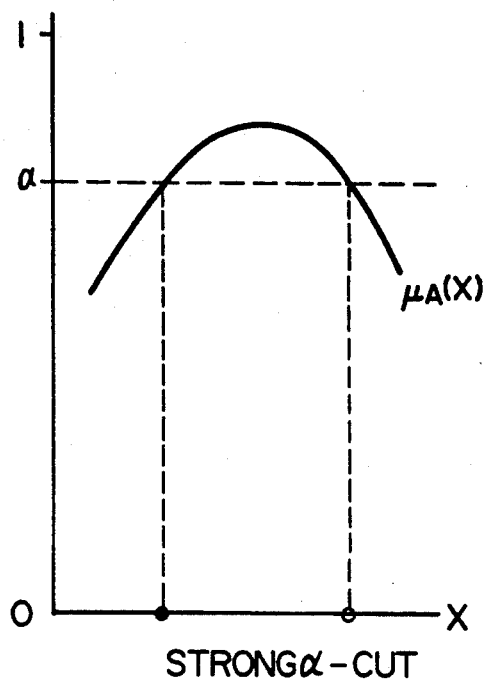
FIGS. 1A and 1B are conceptual charts for illustrating the concept of α-cut method adopted for a membership function.
Figure 1B:
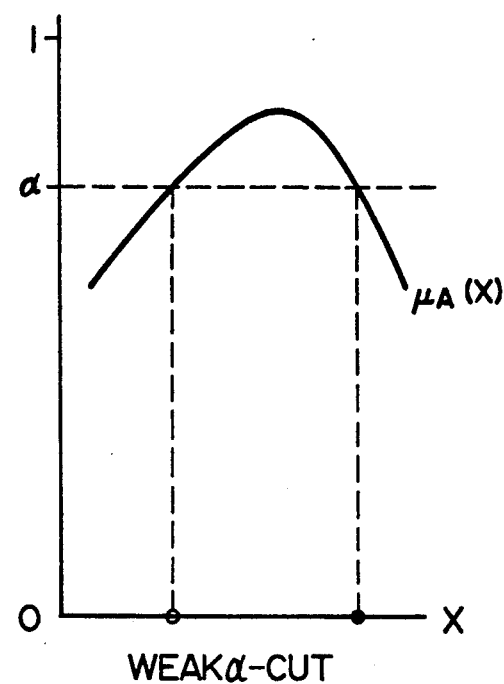
Figure 2:
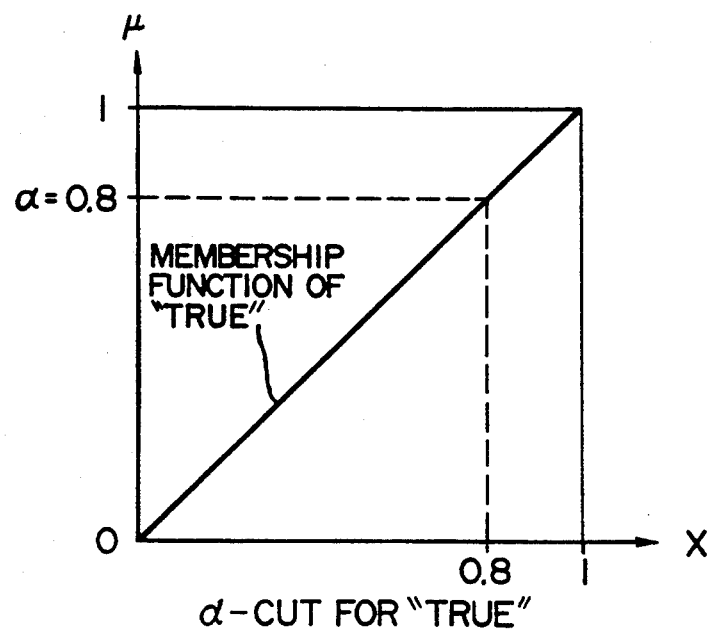
FIG. 2 shows an example of α-cut for a membership function.
Figure 3:
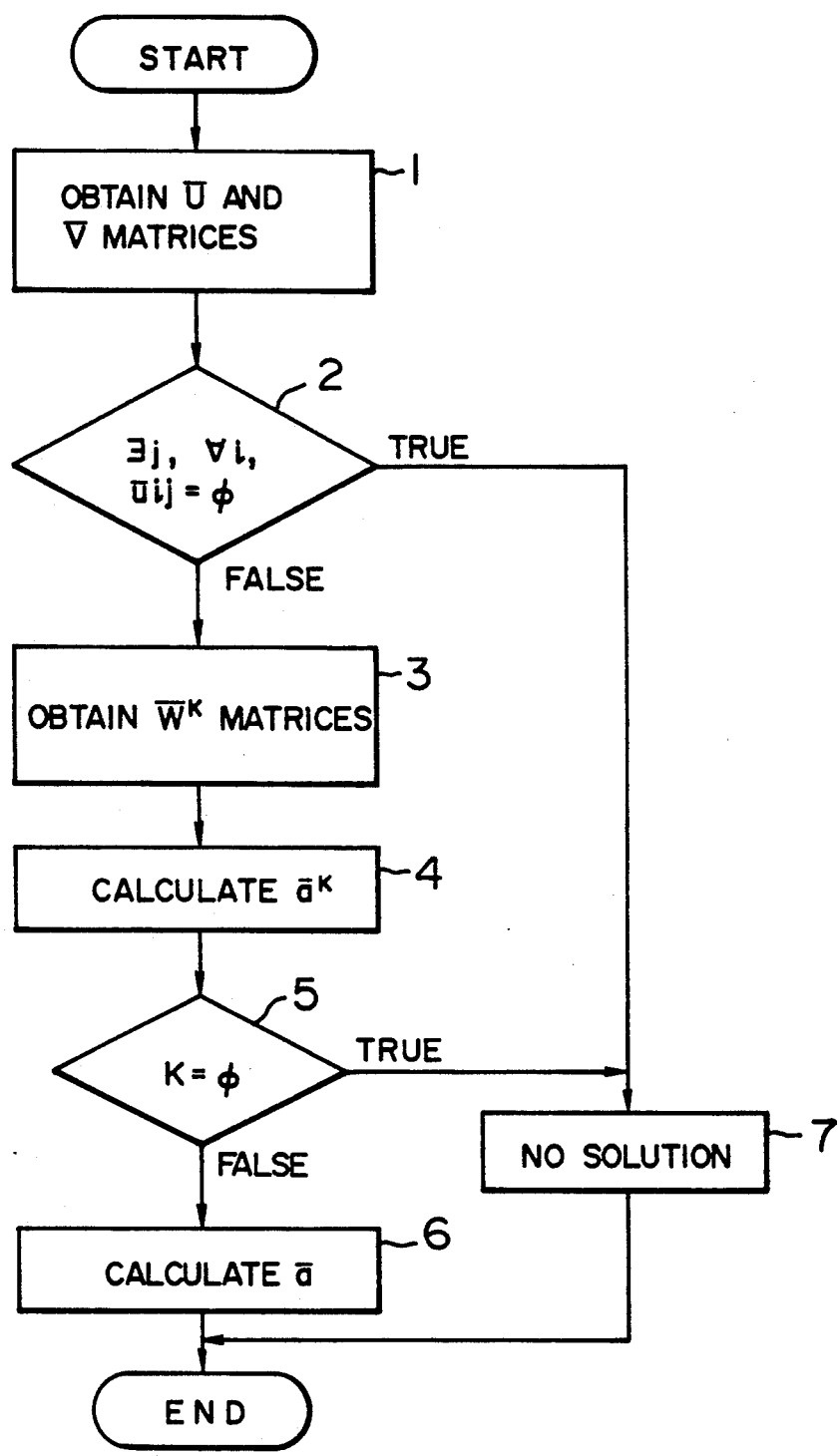
FIG. 3 is a flow chart for illustrating a solution method of an inverse problem of fuzzy correspondence according to the prior art.

Now, the expert system according to the present invention will be described in conjunction with exemplary or preferred embodiments thereof by reference to the drawings.

In the expert system according to the invention, there is employed a backward fuzzy reasoning method in which an inverse problem of fuzzy correspondence is so solved that, when the number of causes is m and the number of results is n, whether or not a solution exists is checked to determine a computation equation for the solution, by using a checking matrix having m×n elements. Accordingly, the theoretical operation amount is given by O(mn). More specifically, at the steps of the reasoning or inference method, solutions, i.e., the m causes inferred through the fuzzy backward reasoning as an inverse problem of the fuzzy correspondence on the basis of the results and the causalities therebetween.

Step 1

Assume that a fuzzy cause set containing m elements indicative of the causes, respectively, is represented by $a(a_i|i=1, \ldots, m)$, a fuzzy result set containing n elements indicating results, respectively, is represented by $b(b_j|j=1, \ldots, n)$, and a fuzzy causality set containing m×n elements indicating the causalities between the causes $a_i$ and the results $b_j$ is represented by $R(r_{ij})$. Then, the linguistic truth values indicating degrees of individual elements belonging to the result set b, as well as the linguistic truth values indicating certainties of individual elements contained in the causality set R are converted into numerical truth value intervals within 0 to 1, respectively, to obtain a result matrix and a causality matrix.

Step 2

By performing $\epsilon$- and $\bar{\epsilon}$-compositions on the result and causality matrices b and R, matrices $U=\{u_{ij}\}$ and $V=\{v_{ij}\}$ each having m×n elements are determined. Then, the minimum of upper bound values, i.e., the least upper bound value of the n elements for every row i of the matrix U except for those of the ewmpty sets is determined as follows:

$$UMIN_i = \min u_{ij(u)}$$

where $u_{ij(u)}$ represents the upper bound value Of an element $u_{ij}$ of the matrix U. When $\exists j, \forall i, u_{ij}=\phi$, then this means that no solution exists. Thus, the processing now being executed is terminated.

That is, the $\epsilon$-composition is represented by $$[a,b] \epsilon [c,d] = u_{ij} = \begin{cases} [c,1], \text{ if } [a,b] \cap [c,d] \neq \phi \text{ (empty set)} \\ [c,d], \text{ if } [a,b] \cap [c,d] = \phi \text{ and } a > d \\ \phi, \text{ if } [a,b] \cap [c,d] = \phi \text{ and } b < c, \end{cases}$$

and the $\bar{\epsilon}$-composition is represented by $$[a,b] \bar{\epsilon} [c,d] = v_{ij} = \begin{cases} [0,d], \text{ if } a > d \\ [0,1], \text{ otherwise} \end{cases}$$

where [a,b] is an elements of the causality matrix R, [c,d] is an element of the result matrix b corresponding to [a,b], a and b in [a,b] are lower and upper bound values, respectively, and c and d in [a,b] are lower and upper bound values, respectively.

Thus, each element of the U matrix represents whether or not a corresponding element of a cause matrix a to be determined, i.e., an element of the solution exists. That is, if $[a,b] \cap [c,d] = \phi$ and b<c, the element $u_{ij}$ is set to be the empty set to represent no solution. When it is determined that the solution exists, the element is used to determine a numerical interval of the solution element. Thus, the element has the possibility that it is the solution element and even if it is not the solution element, a part of the numerical interval for the element may be contained in the solution element. Therefore, since the result matrix b is determined by the operation a·R, i.e., the max-min composition, the least upper bound value of elements in an i-th row of the U matrix except for elements of the empty sets can be determined as a upper bound value of an i-th element of the UMIN matrix.

On the other hand, any element of the V matrix represents a numerical interval within which the operation for determining the lower bound value of an element of the cause matrix corresponding to a V matrix element is not influenced.

Step 3

A matrix $C=\{c_{ij}\}$ having m×n elements is determined from the matrices U and V, where $$c_{ij} = \begin{cases} 1, \text{ if } u_{ij} \neq \phi \text{ and } u_{ij} \neq v_{ij} \\ 0, \text{ otherwise} \end{cases}$$

Then, a sum $CSUM_j$ of the elements $C_{ij}$ is determined for every column j of the matrix C, as follows:

$$CSUM_j = \sum_{i=1}^{m} C_{ij}$$

Thus, each element of the U matrix and a corresponding element of ther V matrix are compared with each other. If the element $u_{ij}$ is not the empty set and not equal to the element $v_{ij}$, a flag of "1" is set in a corresponding element of the C matrix. That the element $u_{ij}$ is equal to the element $v_{ij}$ means that the numerical interval of the element $u_{ij}$ does not influence to the solution element since the numerical interval of the element $v_{ij}$ is determined to prevent the element $v_{ij}$ from influencing to the solution. Therefore, in order to reduce the computation amount, the element $u_{ij}$ can be removed from a lower bound value determining operation for the solution element and the flag of "0" is set in the element $c_{ij}$ corresponding to the element $u_{ij}$.

Step 4

If $c_{ij}=1$ and $u_{ij(l)}>UMIN_i$, "1" in the element $c_{ij}$ is changed to "0" and the element $CSUM_j$ is decreased by one. When this operation results in that $CSUM_j=0$, it is decided that n solution exists, and the processing comes to an end. Parenthetically, $u_{ij(l)}$ represents a lower bound value of the element $u_{ij}$.

The element $UMIN_i$ of the UMIN matrix is a minimum value of the upper bound values of the elements $u_{ij}$ in the i-th row. Therefore, any element of the U matrix having a larger lower bound value $u_{ij(l)}$ than a value of the element $UMIN_i$ is not absolutely used in the operation for determining the solution element. Therefore, in order to remove the element from consideration of the lower bound value of the solution element, corresponding elements of the C matrix are changed into "0" to obtain the modified C matrix.

Step 5

The i-th element $a_i$ of the solution a of the inverse problem of fuzzy correspondence is determined as follows:

(I) When there is no column j, any element of which satisfies $c_{ij}=1$ and $CSUM_j=1$, with respect to the i-th row of the matrix C, then $a_i = [0, UMIN_i]$ (II) When there exists at least one such column j, then $$a_i = [\max_{j_t} u_{Pij(l)}, UMIN_i]$$

where $j_t$ represents the column which satisfies the above condition. As the result of the operations described above, the i-th element $a_i$ of the solution a of the inverse problem of fuzzy correspondence is determined. By performing the processing described above on all the rows of the matrix C, there is obtained the solution $a = (a_1, a_2, \ldots, a_m)$ In the expert system according to the present invention, the solution is displayed or the target apparatus is controlled in accordance with the solution. In this case, an element, i.e., a cause having the maximum certainty of the solution may be used or elements, i.e., causes each having higher certainty than a predetermined level may be used.

In this step, it is required for existance of the solution that a corresponding element of the CSUM matrix is "1". When the CSUM matrix element is "2", it means that two solution exist and the solution therefore is indeterminate. When the CSUM matrix element is "0", it means that no solution exists. It is sufficient for existance of the solution that the CSUM matrix element is "1" and any element $u_{ij}$ of a corresponding column.

By virtue of the inventive arrangement of the procedures described above, a solution of the inverse problem of fuzzy correspondence can be determined as follows:

(I) In case no column j satisfying $c_{ij}=1$ and $CSUM_i=1$ with respect to the i-th row of the matrix C, there are conceivable two cases which will be described below at (I-1) and (I-2), respectively.

Figure 11A:
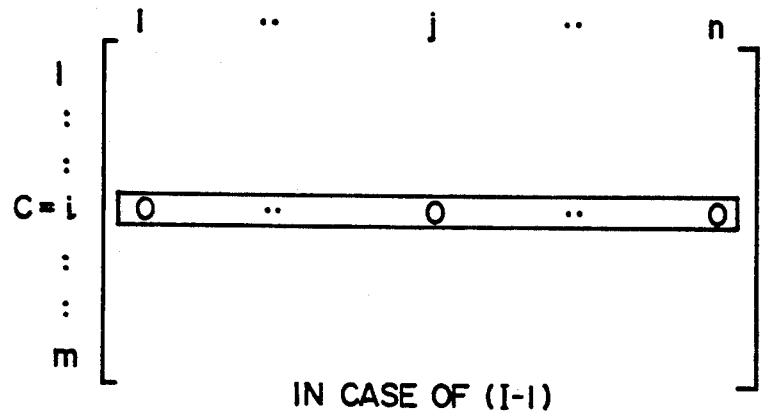

(I-1) Case where no element $c_{ij}$ which is "1" exists at the i-th row of the matrix C at all (FIG. 11A):

In this case, all the elements of the i-th row of the matrix $\overline{W}^k$ determined at the step 3 of the prior art method described hereinbefore corresponds to the elements of the matrix V.

Accordingly, in the case of (I-1), the i-th element of the solution of the inverse problem of fuzzy correspondence can be determined through the processing including the steps 4 to 6 of the prior art method, as follows:

$a_i = [0, UMIN_i]$ (I-2) Case where element $c_{ij}$ satisfying "1" exists at the i-th row of the matrix C while no column satisfying $CSUM_j=1$ exists:

In this case, the column is represented by $j_q$ $(1 \leq q \leq p)$.

Here, let's consider a matrix $C^k$ corresponding to the matrix $\overline{W}^k$ in the prior art. There are conceivable two cases (i) and (ii) mentioned below.

Figure 11B:
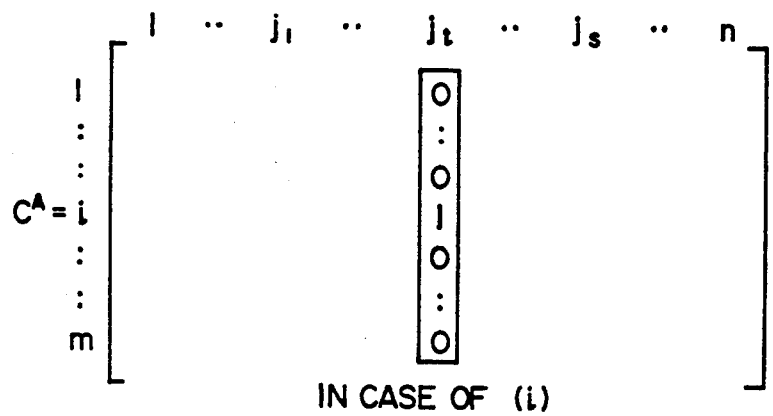

(i) Case where such element exists which is "1" at least any one of the columns $j_q$ at the i-th row of the matrix $C^k$ (FIG. 11B).

In this case, i-th elements $a^k_i$ of $a^k$ can be determined from the step 4 of the prior art solution.

$$a_i^k = [\max_{i_q} u_{ij_q(l)}, UMIN_i]$$

Figure 11C:
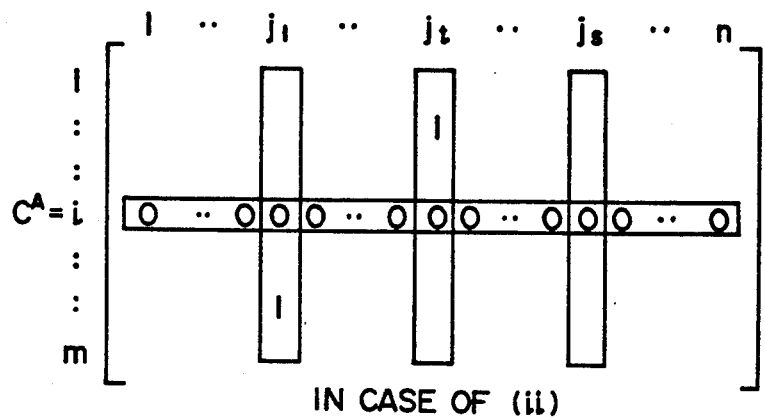

(ii) Case where elements of "1" are absent at all in the columns $j_q$ at the i-th row of the matrix $C^k$ (FIG. 11C).

Similarly to the case (i), the i-th elements $a^k_i$ can be determined as follows:

$a^k_i = [0, UMIN_i]$

The solution of the inverse problem of fuzzy correspondence can be determined by summing $a^k$ determined in the step 4 of the prior art method, in accordance with the procedure described in conjunction with the step 6 of the latter.

Thus, from (i) and (ii), the i-th element of the solution of the inverse problem of fuzzy correspondence can be determined as follows:

$$a_i = [\max_{j_q} u_{ij_q(l)}, UMIN_i] \cup [0, UMIN_i]$$
$$= [0, UMIN_i]$$

In this manner, the i-th element of the solution of the inverse problem of fuzzy correspondence in the case (I) can be determined from through the procedures (I-1) and (I-2), as follows:

$$a_i = [0, UMIN_i]$$

(II) Case where at least one j-th column which satisfies that $c_{ij}=1$ and the $CSUM_i=1$ exists at the i-th row of the matrix C.

The column of this type is represented by $j_t (1 \leq t \leq s)$.

As described hereinbefore in conjunction with the case (I-2), a matrix $C^k$ is considered which corresponds to the matrix $\overline{W}^k$ in the prior art solution method. There are conceivable two cases (II-1) and (II-2), which will be mentioned below.

(II-1) Case where the elements which assume "1" at every column $j_t$ exist at the i-th row in the matrix $C^k$.

In this case, i-th element $a^k_i$ of $a^k$ can be determined similarly to the aforementioned case (i) as follows:

$$a_i^k = [\max_{j_t} u_{ij_t(l)}, UMIN_i]$$

(II-2) Case where elements assuming "1" at other columns that those $j_t$ exist at the i-th row of the matrix $C^k$ (FIG. 11E).

As described hereinbefore in conjunction with the case (i), i-th elements $a^k_i$ of $a^k$ can be determined as follows:

$$a_i^k = [\max_j u_{ij_t(l)}, UMIN_i]$$

In accordance with the step 6 of the prior art solving method, solution of the inverse problem of fuzzy correspondence can be determined by summing $a^k$ determined in the step 4 of the prior art method. Accordingly, the i-th element in the solution of the inverse problem of fuzzy correspondence in the case of (II) can be determined as follows:

$$a_i = [\max_{j_t} u_{ij_t(l)}, UMIN_i] \cup [\max_j u_{ij(l)}, UMIN_i]$$

$$= [\max_{j_t} u_{ij_t(l)}, UMIN_i]$$

As will be understood from the foregoing, in the method of solving the inverse problem of fuzzy correspondence according to the present invention, the solution can be determined only from a product set and a sum set of the interval values of elements of the matrices U and V because the upper bound values of the interval values resulting from the $\bar{\epsilon}$-composition and the $\epsilon$-composition are equal to each other. In other words, the solution can be obtained through only calculation of the maximum and minimum values.

Figure 4:
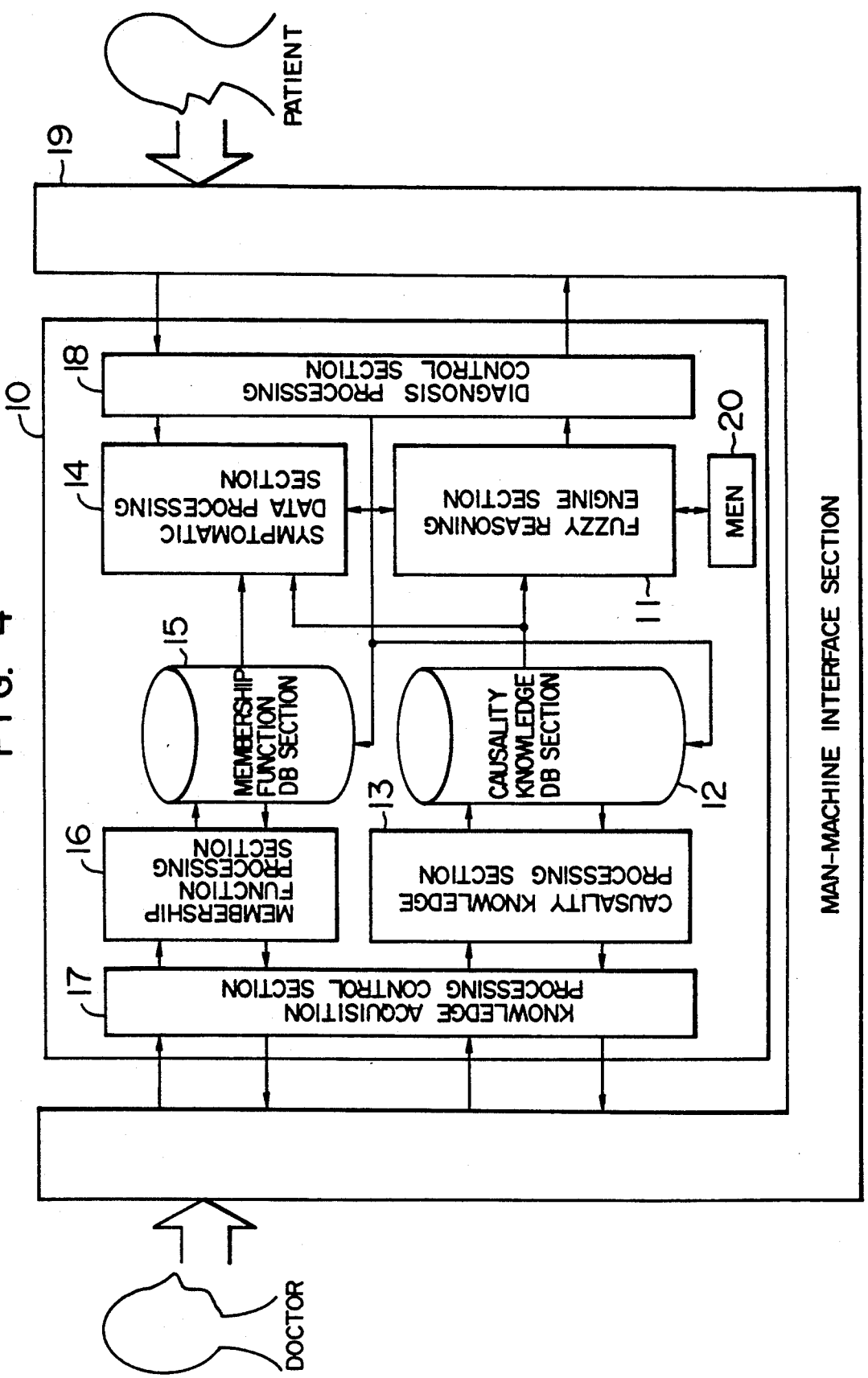
FIG. 4 is a block diagram showing a structure of a fuzzy expert system according to an embodiment of the present invention.

Now, description will be turned to an exemplary embodiment of the expert system according to the present invention. FIG. 4 shows a general arrangement of a fuzzy expert system. Although the following description will be made in conjunction with an expert system for medical diagnoses, it should be understood that this is only for the purpose of illustration and the concept of the invention can equally be applied to other expert systems designed for other purposes such as fault diagnosis and others.

Referring to FIG. 4, an electronic computer system 10 adapted for performing data input/output, data storage and control operations is composed of a fuzzy reasoning (inference) engine section 11 which serves for performing the backward fuzzy reasoning with the theoretical operation amount of O(mn) and which constitutes a center of the system, a causality knowledge database 12, a causality knowledge processing section 13, a symptomatic data processing section 14, a membership function processing section 16, a knowledge acquisition processing control section 17, and a diagnosis processing control section 18. The computer system 10 is connected to a man-machine interface section 19 to complete the whole system.

Figure 5:
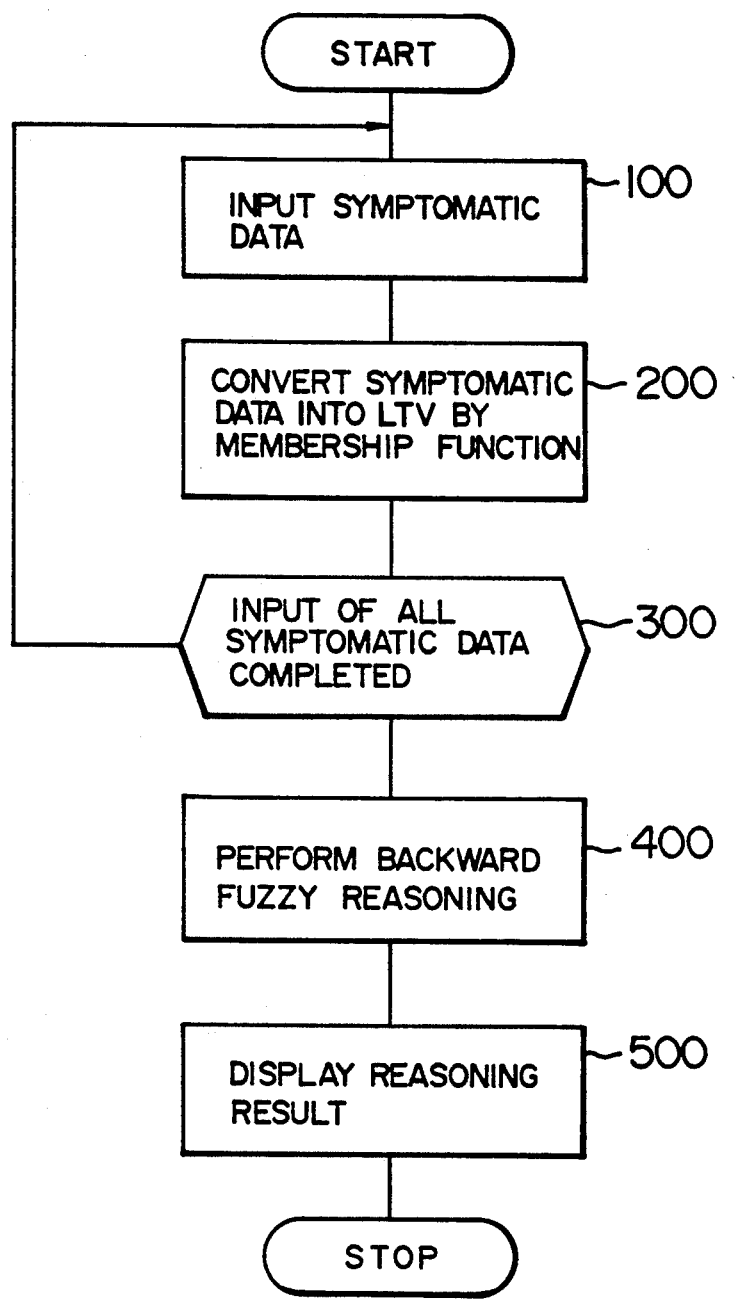
FIG. 5 is a flow chart for illustrating a diagnostic operation of the expert system shown in FIG. 4.
Figure 6:
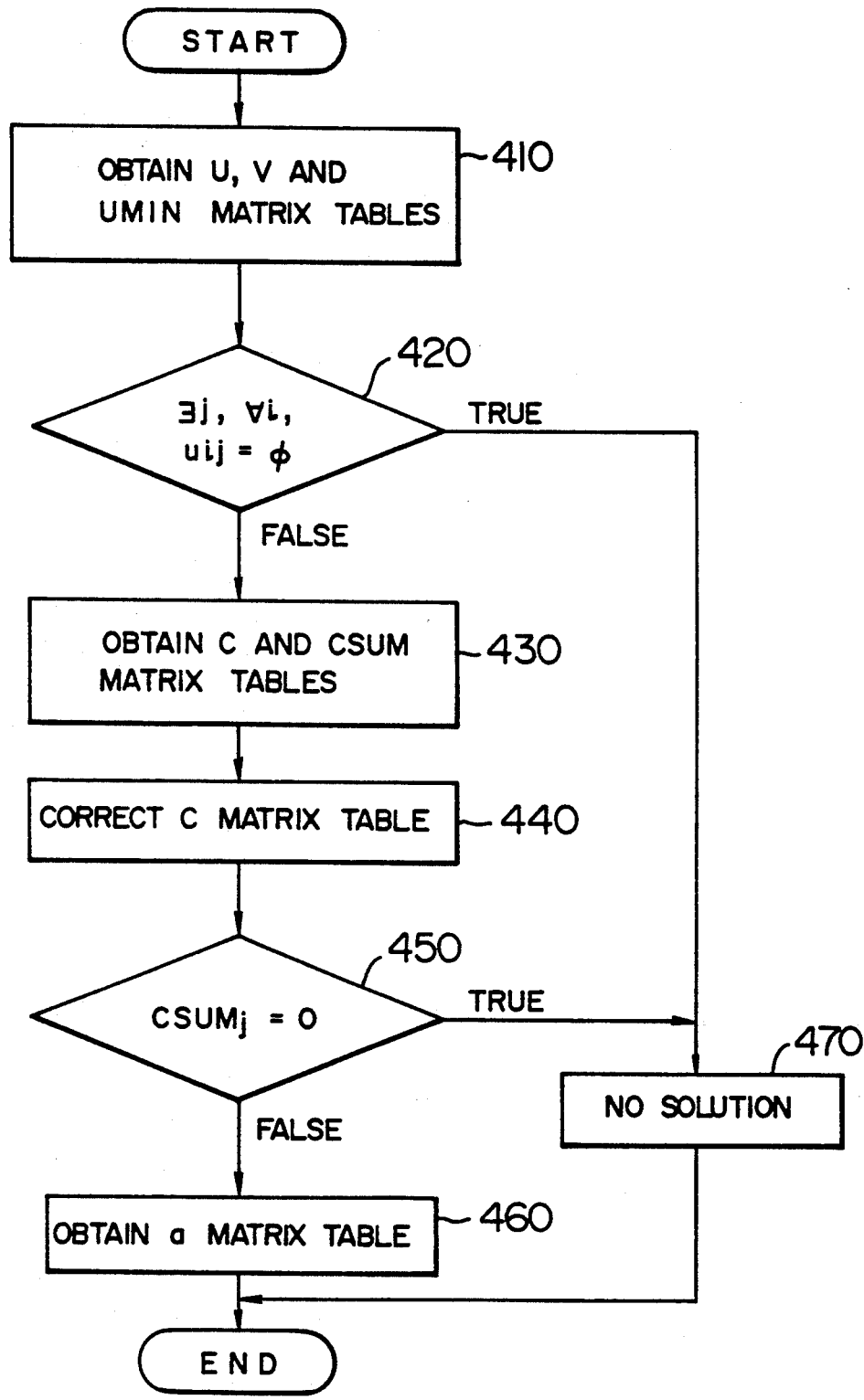
FIG. 6 is a flow chart for illustrating a method for solution of an inverse problem of fuzzy correspondence according to an embodiment of the invention.

Next, description will be made of an operation of the expert system according to the first embodiment of the invention by reference to a flow chart shown in FIG. 5.

For the operation of the illustrated expert system, a doctor starts the control section 17 and inputs to the section 13 data concerning disease and symptoms in a LTV (linguistic truth values) manner to prepare a causality table required for the diagnosis at the database section 12. An example of such table is shown in FIG. 9.

Figure 10:
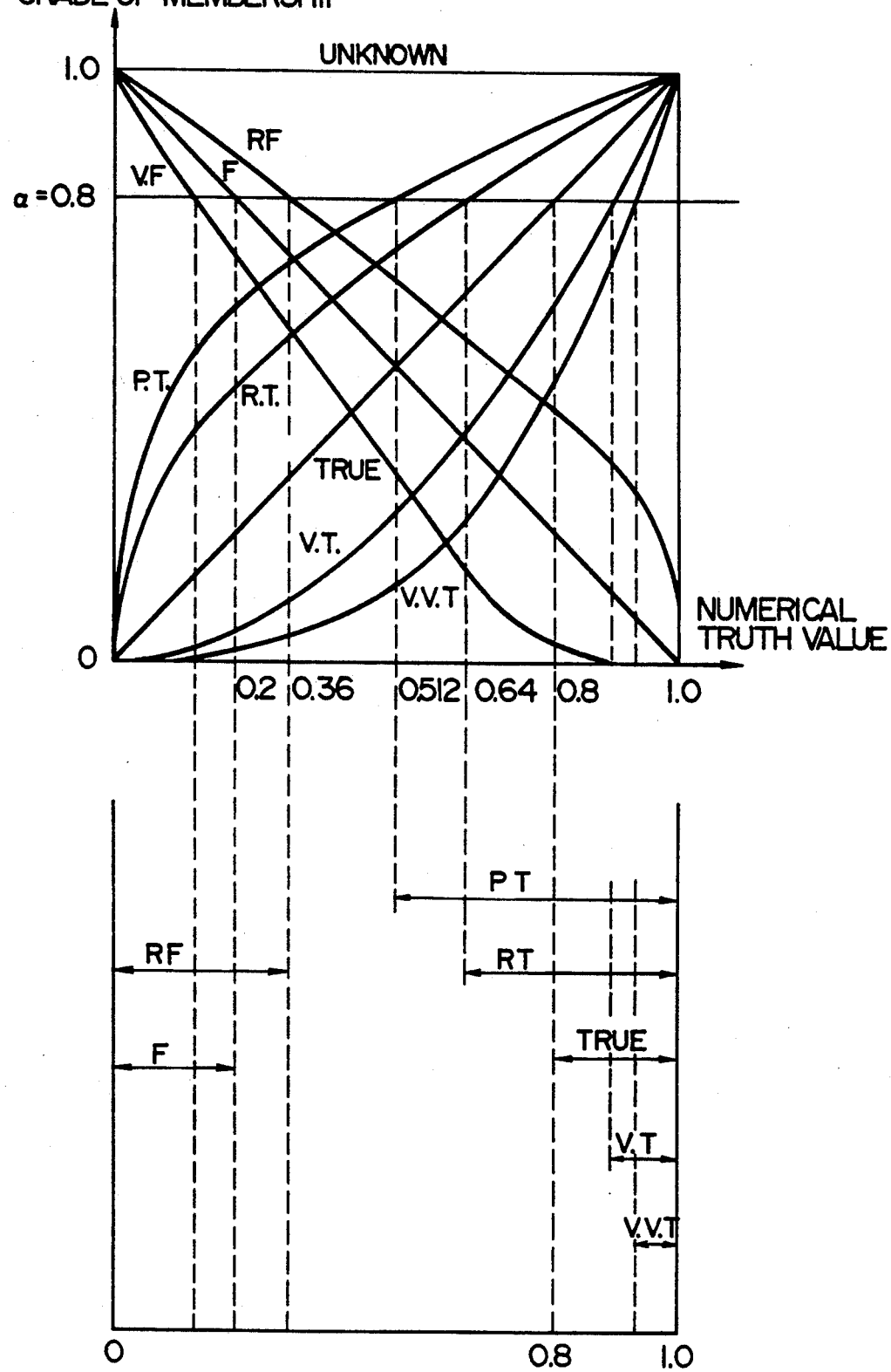
FIG. 10 is a graphic chart showing examples of membership functions for linguistic truth values and illustrating translation of the linguistic truth values into numerical intervals by a α-cut method.

Membership functions in a LTV manner are previously established, as shown in FIG. 10, by the processing section 16 and stored in the database section 15. Translation of each LTV into a numerical interval is performed by the processing section 14 in accordance with a membership function and a preset α-cut value, e.g., α=0.8 in a manner illustrated in FIG. 10. Needless to say, when the symptomatic data or the causality data are given in the form of numerical intervals within [0, 1], the processing section 14 can be omitted.

Now suppose that a numerical interval is to be assigned to the LTV of "true". In this case, a membership function TRUE corresponding to the LTV of "true" is inputted from the database section 12 to the processing section 14 by the control section 18 to use for the α-cutting with α=0.8, as a result of which a numerical interval [0.8, 1] is assigned to the LTV of "true". Parenthetically, the value for the α-cutting can be adjusted by the control section 18.

Examples of the LTVs and the relevant membership function used in this illustrated embodiment are shown, being understood that these are only by way of example and may assume other different forms.

Completely True $(CT) = \int_{x \in [0,1]} 0/x + 1/1$

Very very True $(VVT) = (true)^3$

Very True $(VT) = (true)^2$

True $(T) = \int_{x \in [0,1]} x/x$

Rather True $(RT) = \sqrt{true}$

Possible True $(PT) = \sqrt[3]{true}$

Completely False $(CF) = 1/0 + \int_{x \in [0,1]} 0/x$

Very ver False $(VVF) = (false)^3$

Very False $(VF) = (false)^2$

False $(F) = \int_{x \in [0,1]} (1-x)/x$

-continued

Rather False (RF) = $\sqrt{\text{false}}$

PossibleFalse (PF) = $\sqrt[3]{\text{false}}$

Unknown (UK) = $\int_{x\in[0,1]} 1/x$

Subsequently, at a step 100 shown in FIG. 5, symptom (result) data b obtained by hearing the patient is inputted to the expert system 10 through the interface section 19. Of course, such data b may be inputted directly by the pertinent him- or herself. The inputting of the symptom data b is controlled by the control section 18 and may be executed, for example, in the form of reply to the oral inquiry by the doctor. At a step 200, the control section 18 accesses the database section 12 and 15 to allow the processing section 14 to fretch therein the membership functions and the causality R. The causality R is translated from the LTV to a numerical interval to generate a causality matrix table R which is transferred to the fuzzy reasoning engine section 11 and stored in a memory 20. The symptom data inputted from te control section 18 is translated into a numerical interval matrix table b by using the membership function and stored in the memory 20 by the engine section 11. When the symptom data is numerical data such as bodily temperature, the symptom data is once translated into a corresponding LTV at the section 14 on the basis of the first membership function inputted from the database section 15. Each of the LTVs of the symptom (result) data $b(b_1, \ldots, b_n)$ and the causality data $R(\gamma_{ij}$ $|i=1-m, j=1-n)$ read out from the database section 12 and representing correspondence relation to the data b is translated to a numerical interval containing an upper bound value (u) and a lower bound value (l) in accordance with the membership function established previously for each of the LTVs and a value preset for the α-cutting at the processing section 14. For the LTV of "true", the maximum upper bound value of the relevant numerical truth value is "1" (one), while for the LTV of "false", the minimum numerical truth value is "0" (zero). Further, when the symptoms themselves are expressed in terms of the LTVs of the same species (such as exemplified by "very high temperature", "considerably high temperature", "slightly high temperature", etc.), the symptom data can straight forwardly be inputted to the second membership function. On the other hand, when the symptoms are expressed in terms of LTVs of different species (such as exemplified by "very unwell", "considerably unwell", "slightly unwell", etc.), transformation of these LTVs is performed by using the first membership function.

A simple example of the method of reasoning or inferring the causes from symptoms inputted will be shown below on the assumption that the number of the causes is three with that the symptoms being four, assuming further that the causalities R between the causes and the symptoms and the symptoms b are given as below.

$$R = \begin{bmatrix} T & F & UK & PF \\ RF & UK & RT & UK \\ PT & UK & RF & RT \end{bmatrix}$$

$$b = [PT \quad PF \quad RF \quad RT]$$

The LTVs are then translated into numerical truth values mentioned below by using the membership functions shown in FIG. 10 with α being 0.8, to generate matrix tables R and b.

$$R = \begin{bmatrix} [0.8, 1] & [0, 0.2] & [0, 1] & [0, 0.488] \\ [0, 0.36] & [0, 1] & [0.64, 1] & [0, 1] \\ [0.512, 1] & [0, 1] & [0, 0.36] & [0.64, 1] \end{bmatrix}$$

$$b = [[0.512, 1] \quad [0, 0.488] \quad [0, 0.36] \quad [0.64, 1]]$$

Figure 7:
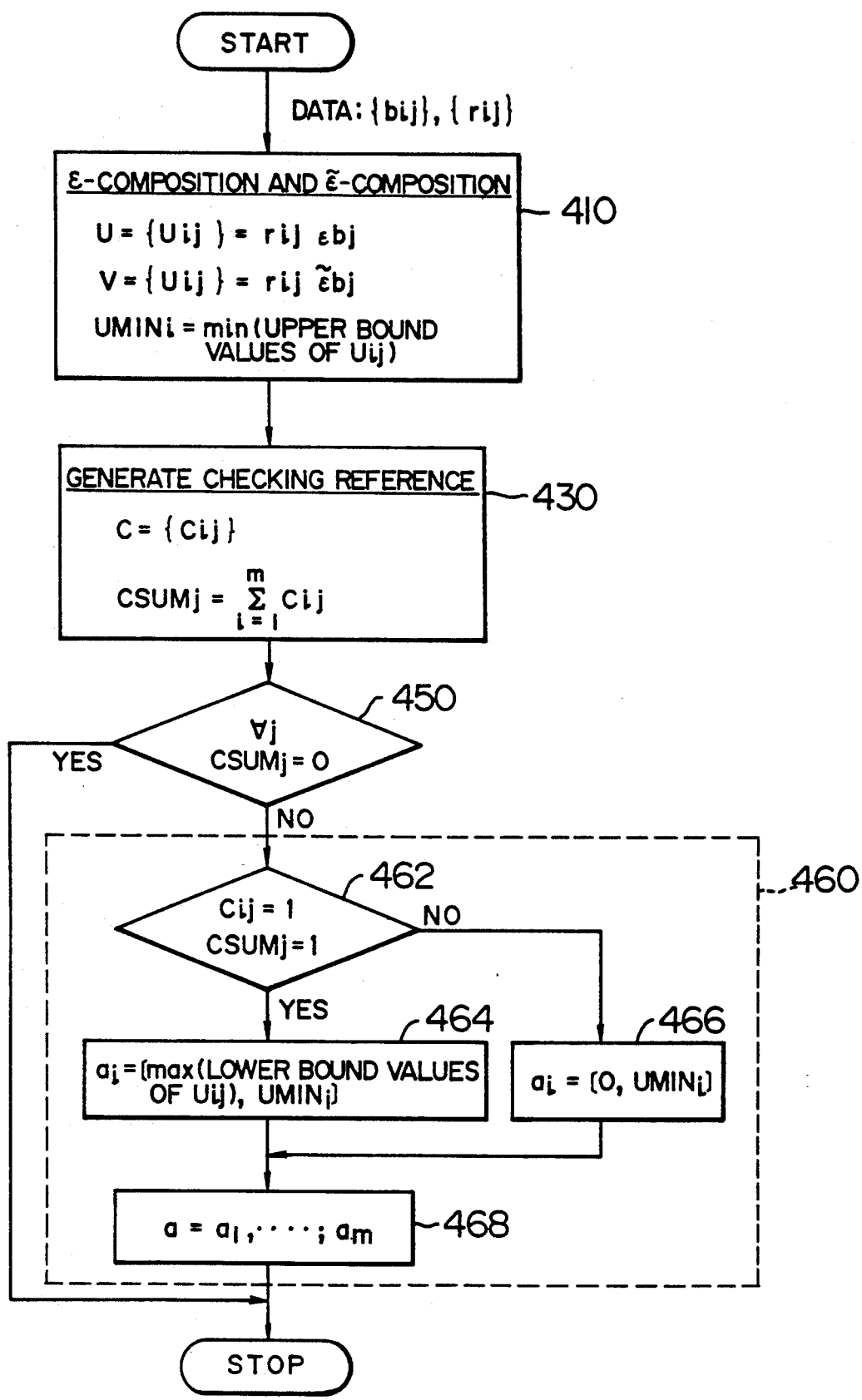
FIGS. 7 and 8 are flow charts for illustrating inference or reasoning operations according to a second embodiment of the invention.
Figure 8:
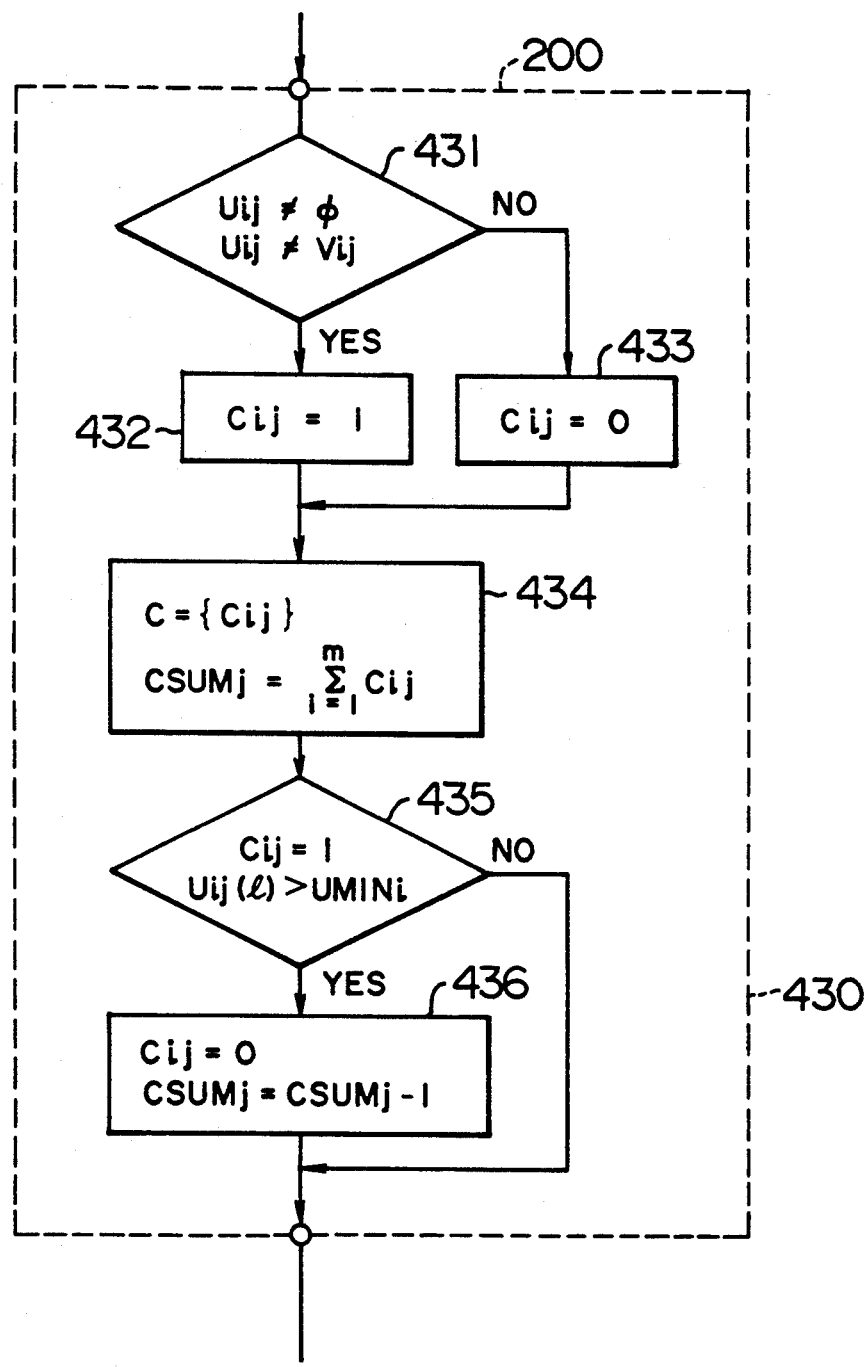

Next, the matrix tables R and b defined by the numerical intervals, depending on the α-cut value, are supplied to the engine section 11, whereby the matrix table $a(a_1, \ldots, a_m)$ representing the causes is inferred as the inverse problem of fuzzy correspondence at a step 400. FIGS. 7 and 8 are flow charts illustrating the reasoning or inference procedure to this end.

At first, at a step 410, a matrix table U with m×n elements resulting from the ε-composition for the matrix tables R and b and a matrix table V with m×n elements resulting from the ε-composition for the matrix tables R and b are prepared from the two interval value sets of the matrix tables R and b, i.e., $[r_{ij(l)}, r_{ij(u)}]$, $[b_{j(l)}, b_{j(u)}]$ [0, 1]. A lower bound value $U_{ij(l)}$ of each element of a j-th column of the matrix table U is set as the lower bound value $b_{j(l)}$ of the element $b_j$ of the matrix table b, while the upper bound value $U_{ij(u)}$ thereof is set to be "1" provided that $$[\gamma_{ij(l)}, \gamma_{ij(u)}] \cap [b_{j(l)}, b_{j(u)}] = \phi. \text{ When}$$

$$[\gamma_{ij(l)}, \gamma_{ij(u)}] \cap [b_{j(l)}, b_{j(u)}] = \phi, \text{ and}$$

$$\gamma_{ij(l)} > b_{j(u)}$$

the $b_{j(u)}$ is set is the upper bound value. However, a greater lower bound value of the symptom matrix b than the upper bound value of the element $u_{ij}$ of the causality matrix table R, i.e., $\gamma_{ij(u)} < b_{j(l)}$ can not apply valid, the relevant element is set to be $\phi$ (empty set). On the other hand, the lower bound values $V_{ij(l)}$ of the individual elements at all the columns in the matrix table V are set to "0", while the lower bound values of elements satisfying $\gamma_{ij(l)} > b_{j(u)}$ are set to "0" with all the others being set to "1". Additionally, the minimum value min $\gamma_{ij(u)}$ of the upper bound values of the elements for each row in the matrix table U is obtained as an element UMIN$_i$ to thereby determine a matrix table UMIN.

As a result of the above processing, when each elements of any column is $\phi$, the processing is ended with no solution at a step 420.

The matrix tables U and V obtained in accordance with the algorithm described above are shown below and they are stored in the memory 20.

$$U = \begin{bmatrix} [0.512, 1] & [0, 1] & [0, 1] & \phi \\ \phi & [0, 1] & [0, 0.36] & [0.64, 1] \\ [0.512, 1] & [0, 1] & [0, 1] & [0.64, 1] \end{bmatrix}$$

$$V = \begin{bmatrix} [0,1] & [0,1] & [0,1] & [0,1] \\ [0,1] & [0,1] & [0,0.36] & [0,1] \\ [0,1] & [0,1] & [0,1] & [0,1] \end{bmatrix}$$

At the same time the matrix table UMIN can be determined as follows:

UMIN = [1, 0.36, 1]

Next, at a step 430, decision is made as to the presence or absence of the solution a, which is then followed by preparation of a checking reference or criterion for determining an equation for calculation when the solution a is found to be present at the step 430. The checking criterion contains a matrix table C with m×n elements and a matrix table CSUM prepared on the basis of the matrix tables U and V and the matrix table CSUM represents sums of the individual elements of the matrix table C determined for every column. This procedure is shown in FIG. 8 and the two matrix tables are stored in the memory 20. At steps 431 to 433, the values of the individual elements $C_{ij}$ of the matrix table C are set to be "1" unless a corresponding element $U_{ij}$ of the matrix table U is not the empty set and unless the corresponding element $U_{ij}$ is equal to a corresponding element $V_{ij}$ of the matrix table V, while otherwise all set to "0". Further, at a step 434, the matrix table CSUM is obtained by determining a sum of elements for every column j of the matrix table C, where the matrix table CSUM is given by $$CSUM_j = \sum_{i=1}^{m} C_{ij}$$

Subsequently, at a step 435, the elements of "1" are searched from the matrix table C, and those elements of the matrix U corresponding to the abovementioned elements and having the lower bound values greater than those of the elements $UMIN_i$, i.e., those elements which satisfy $U_{ij(l)} > UMIN_i$ are searched. When they are found, "1s" in the matrix table C are changed to "0s" and the elements $CSUM_j$ is decreased by "1". Otherwise, no operation is performed. On the basis of the result obtained from the execution of the processing mentioned above, the check criterion is altered or modified.

Thus, the matrix tables C and CSUM are determined $$C = \begin{bmatrix} 1 & 0 & 0 & 0 \\ 0 & 0 & 0 & 1 \\ 1 & 0 & 0 & 1 \end{bmatrix}$$

CSUM = [2 0 0 2]

The alteration of the matrix tables results in the matrix table C and CSUM mentioned below.

$$C = \begin{bmatrix} 1 & 0 & 0 & 0 \\ 0 & 0 & 0 & 0 \\ 1 & 0 & 0 & 1 \end{bmatrix}$$

CSUM = [2 0 0 1]

When it is found at the step 450 that the elements of the matrix table CSUM are all "0", it is decided that no solution exists, and then execution of the processing comes to an end. Finally, at a step 450, the matrix table $a(a_j)$ is determined, details of which are illustrated in FIG. 7. When such column exists for which the elements $C_{ij}$ of the i-th row of the matrix table C are "1" and for which the elements $CSUM_i$ of the matrix table CSUM corresponding to those of the j-th column of the matrix table C are "1", then the maximum one of the lower bound values of the corresponding elements $U_{ij}$ of the matrix table U is selected provided that at least one element $C_{ij}$ satisfying the above conditions exists at the row of concern, to thereby determine $a_i$ which is given by:

$a_i = [\max U_{ij(l)}, UMIN_i]$

Unless the abovementioned column exists, then the element $a_i$ is determined as $a_i = [0, UMIN_i]$ provided that none of the elements $C_{ij}$ satisfies the abovementioned condition. Thus, $$a = \begin{bmatrix} [0,1] \\ [0,0.36] \\ [0.64,1] \end{bmatrix}$$

The a of the causes obtained at the reasoning or inference engine section through the procedure described above is translated into LTVs by the processing section 14, whereby linguistic information indicating the degree of certainty of the causes $a_1, \ldots, a_m$ for the inputted symptom data is generated. The result as obtained is such as mentioned below.

$$a = \begin{bmatrix} UK \\ RF \\ RT \end{bmatrix}$$

This result is outputted through the interface section 19 and indicates that the cause (disease) of the inputted symptom is the element "$a_3$" with the certainty of RT (rather true = $\sqrt{true}$). When the element $a_1$ or $a_2$ indicates PT (possible true) or higher truth level, it is decided as the result of the diagnosis that the patient possibly suffers from a plurality of diseases concurrently. The results of the diagnosis are displayed at the interface section 19 which includes a display unit, an input-/output unit such as keyboard and others.

Figures 12, 13:
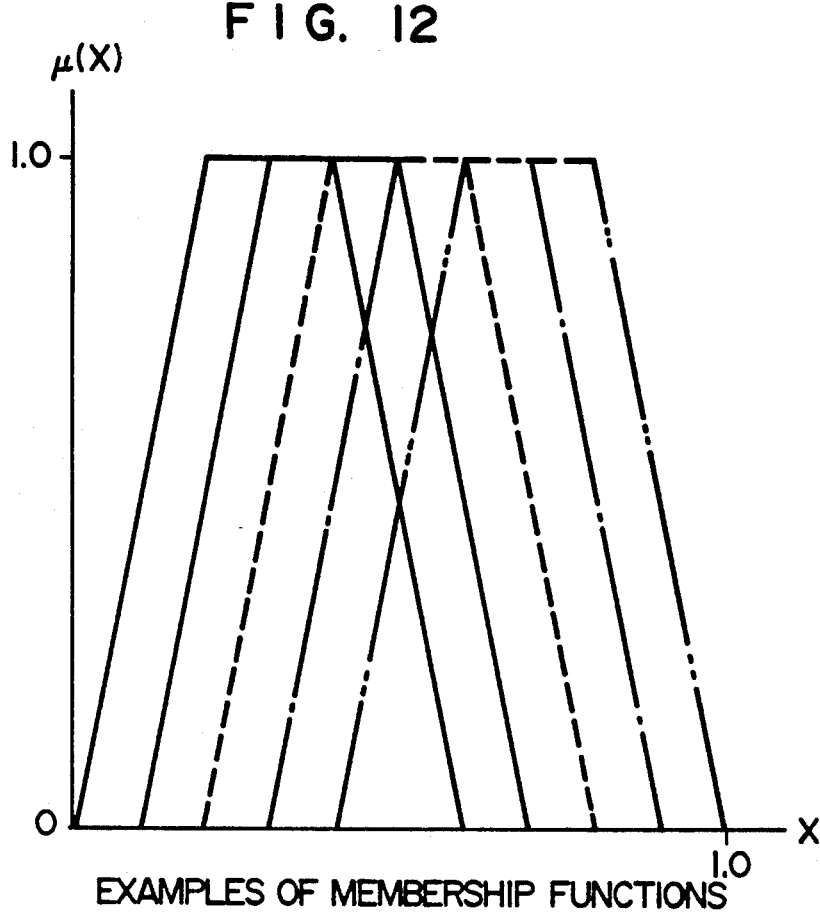
FIG. 12 is a chart illustrating an example of membership function employed in an experiment for verifying the effects attainable with the present invention.
FIG. 13 is a chart for illustrating the times required for the inventive inferences or reasonings in comparison with those of the prior art.

The reasoning or inference method according to the invention and the prior art method were compared in respect to the effectiveness through numerical experiments (with seven causes and seven symptoms). Fuzzy sets defined by the membership functions illustrated in FIG. 12 were established for ten problems selected at random for determining the causalities between causes and symptoms and the degrees of the latter, and then the backward fuzzy reasoning were performed. The time taken for the reasoning or inference is illustrated in FIG. 13. As can be seen in the figure, when the prior art solving method is adopted, the time taken for the inference differs from one to another problems. In contrast, when the inventive method is adopted, the backward reasoning can be executed within the substantially same time span. Besides, according to the inventive inference method, the time taken is on an average about 1/40000 and at minimum about 1/100000 of that taken in the reasoning based on the prior art method. To say in another way, the backward reasoning can be executed at a surprisingly increased speed according to the teaching of the invention. Thus, very high effectiveness of the inventive method has been proved.

According to the inventive method of solution of the inverse problem of fuzzy correspondence, the time taken for determining elements al of a solution a is in proportion to the number n of symptoms. Consequently, the time taken for determining the solution a of the inverse problem of fuzzy correspondence is proportional to mn, where n represents the number of the causes. The theoretical calculation amount is given by $O(mn)$.

As will be apparent from the above, according to the method of reasoning or inference incarnated in the illustrated embodiment of the invention where the matrix W composed of $m^{m-1} \cdot n$ combinations is replaced by the matrix table C containing only mn combinations, the reasoning or inference speed can surprisingly be increased. Thus, the concept of the invention can profitably be applied to a real time expert system.

Figure 14:
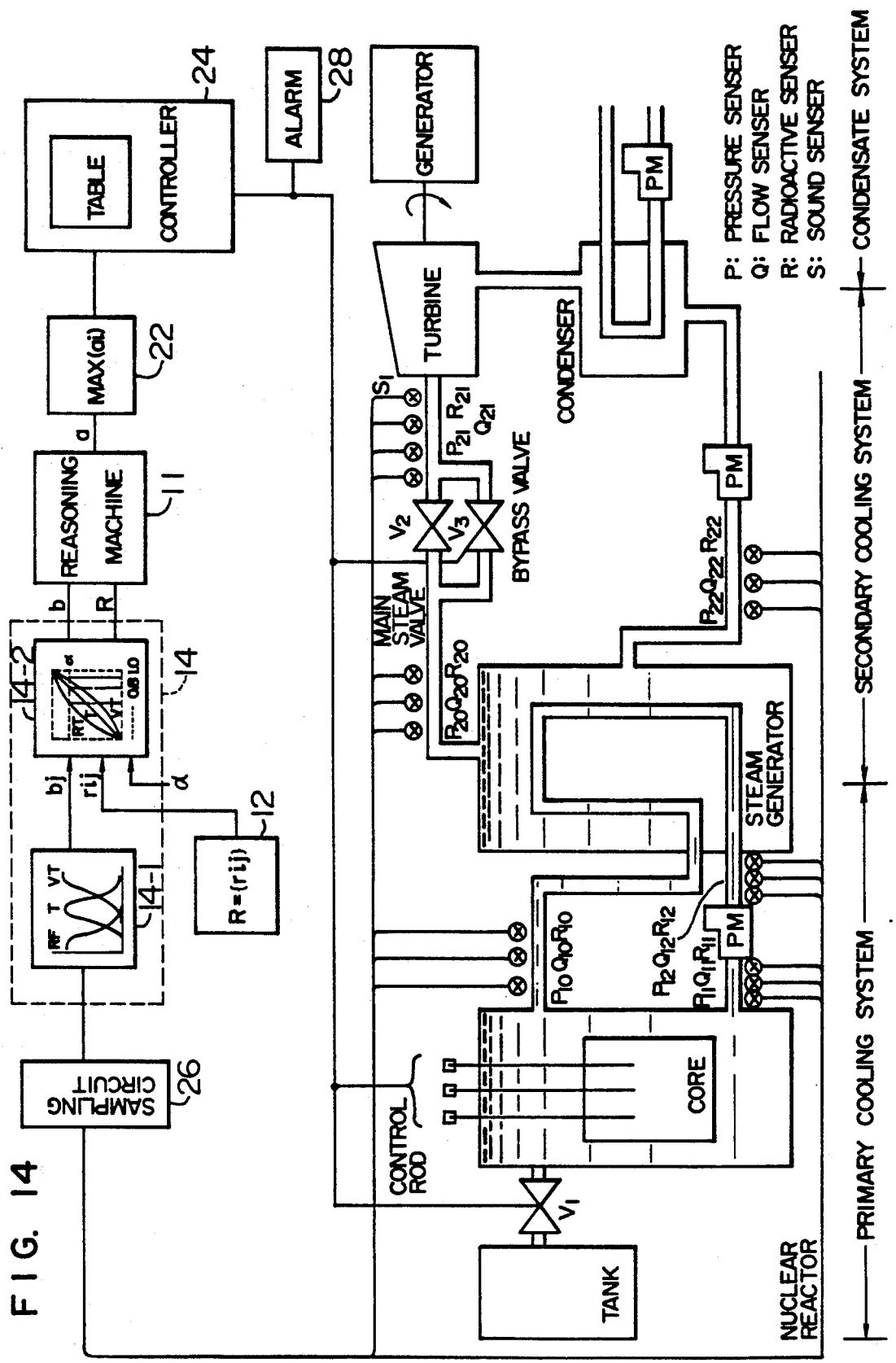
FIG. 14 is a diagram for illustrating an expert system according to a second exemplary embodiment of the present invention.

Next, a second embodiment of the invention will be described by reference to FIG. 14 which shows an expert system to which the inventive fuzzy backward reasoning scheme is applied for performing diagnosis of a nuclear power plant requiring a real time response. It should however be noted that the object to be controlled is not restricted to the nuclear power plant. In FIG. 14, like reference symbols as those shown in FIG. 4 are used for designating same or like components.

Description will now be made on the assumption that the nuclear power plant is of a pressurized water reactor type well known in the art. The structure of the control system for the plant is substantially same as that shown in FIG. 4. Accordingly repeated description will be unnecessary. A large number of sensors are installed at various locations in the nuclear power plant. In FIG. 14, reference symbol P denotes a pressure sensor, Q denotes a flow sensor, R denotes a radiation flux sensor, and S denotes an acoustic sensor for detecting vibrations of pipes or the like. The signals output from these sensors are supplied to a sampling circuit 26 which samples these signals at a predetermined time interval. The output data from the sampling circuit are then transferred to a first membership function 14-1 where the numerical data originating in the sensors P, Q and R are translated into the LTV data to be subsequently transferred to a second membership function 14-2. In case the signal from, for example, the sensor S is inputted in the form compatible with the LTV, the function 14-1 then transfers the input signal S to the function 14-2 without translating it into the LTV form. The function 14-2 is also supplied with the causality data R and $\alpha$ from the section 12. Thus, the function 14-2 generates matrix tables b and R on the basis of the LTV, the causality R and $\alpha$, the matrix tables b and R being then outputted to the reasoning engine 11. The machine 11 derives a matrix table a from the matrix table b and R through inference or reasoning procedure illustrated in the flow chart of FIG. 5. The matrix table a is then outputted to a maximum value circuit 22 which detects an element $a_{max}$ having a highest certainty among those of the matrix table a, the element $a_{max}$ being then outputted to a controller 24, at which a table is referred to for determining and controlling the object of concern.

Assuming, for example, that a fault is believed to occur in a valve V2 of a secondary cooling system with the highest certainty, control is so made as to open a bypass valve V3 while triggering an alarm 28 simultaneously. Subsequently, measures to cope with the prevailing situation are taken. When it is believed with the highest certainty that the fault takes place in a primary cooling system, control rods are then fallen in the reactor core or water is injected into the reactor from a tank. When it is found with certainty that pressure or radioactivity is slightly higher than the normal level although the safety level is not exceeded, a corresponding alarm may be signaled.

The nuclear power plant is of a very complicated system and an extremely high safety must be ensured. The measures for coping with any faults must be taken as rapidly as possible, which means that the control must be performed on a real time basis. In this conjunction, it will readily be understood that upon detection of abnormality, suitable measures can timely be taken before actual occurrence of fault such as breakage of a pipe and other on the basis of the degree of certainty obtained as a result of the real time backward reasoning.

It should be added that although only the maximum value of the certainty is made use of in the case of the abovementioned embodiment, all the elements of the matrix table a may be utilized for controlling the system of concern. In this case, the circuit 22 can be omitted.

What is claimed is:

1. An expert system for controlling a target apparatus comprising:
   supplying means for supplying n states of the target apparatus (n is an integer and larger than or equal to 2);
   reasoning means for receiving the n states as n results from said supplying means and performing fuzzy backward reasoning for a data representing the n results and causality data to generate certainties of m causes (m is an integer and larger than or equal to 2),
   wherein each of the certainties is represented in a cause matrix table having m elements, each of which is represented by an interval data, and the causality data is represented by a causality matrix table having m×n elements, each of which indicates a membership grade of a corresponding cause to a corresponding result and is represented by an interval data, and
   wherein in the fuzzy backward reasoning said reasoning means converts the n result data into a result matrix table having n elements, each of which is represented by an interval data, performs $\overline{\epsilon}$- and $\epsilon$-compositions for the result and causality matrix tables to generate first and second matrix tables, generates from the first matrix table a third matrix table having m elements, each of which represent a least upper bound value of a corresponding row of the first matrix table, generates from the first and second matrix tables a check matrix table having m×n elements, each of which represents a possibility of influence to the certainty of a corresponding cause, and generates the cause matrix table from the first, third and check matrix tables, the cause matrix table element interval data representing a certainty of a corresponding cause;

control means for controlling the target apparatus based on the certainties of the elements of the cause matrix table.

2. A system according to claim 1, wherein said reasoning means includes:

sampling means for sampling the n states to generate the n results; and converting means for converting the n results into the result matrix table using a plurality of conversion tables.

3. A system according to claim 1, wherein said reasoning means includes:

sampling means for sampling the n states to generate the n results;

first converting means for converting the n results into a LTV matrix table using a plurality of first conversion tables; and second converting means for converting the n LTV table into the result matrix table using a plurality of second conversion tables and a plurality of predetermined values.

4. A system according to claim 1, wherein said reasoning means further comprises:

storing means for storing a plurality of membership function tables;

converting means for reading out the membership function tables from said storing means and converting the causality data into the causality matrix table by applying an associated one of the read out membership function tables with an associated predetermined value to each element of the causality data.

5. A system according to claim 1, wherein said reasoning means requires a theoretical operation time proportional to a value of $m \times n$.

6. A system according to claim 1, wherein said control means controls the target apparatus based on a cause corresponding to an element having a maximum certainty of the cause matrix table.

7. A system according to claim 1, wherein said control means controls the target apparatus based on causes corresponding to elements of the cause matrix table having certainties higher than a predetermined certainty.

8. A system according to claim 1, wherein said reasoning means comprises:

memory means for storing the causality matrix table;

first generating means for reading out the causality matrix table from said memory means and generating the first and second matrix tables from the causality table and the result matrix table from the n result data;

second generating means for generating the third matrix table having m elements, each of which represent a least upper bound value of a corresponding row of the first matrix table;

third generating means for generating from the first and second matrix tables the check matrix table having $m \times n$ elements, each of which has a flag set when representing a possibility of influence to a certainty of a corresponding cause;

modifying means for modifying the check matrix table to selectively reset each flag in accordance with corresponding elements of the first and third matrix tables; and fourth generating means for generating from elements having the flags set of the check matrix table and the first and third matrix tables cause the matrix tables.

9. A system according to claim 8, wherein said reasoning means requires a theoretical operation time proportional to a value of $m \times n$.

* * * * *